United States Patent [19]
Bellamy et al.

[11] Patent Number: 5,957,439
[45] Date of Patent: Sep. 28, 1999

[54] HYDRAULIC ANTIVIBRATION SUPPORT

[75] Inventors: Alain Bellamy, Naveil; Denis Reh, Thiville, both of France

[73] Assignee: Hutchinson, Paris, France

[21] Appl. No.: 09/119,278

[22] Filed: Jul. 20, 1998

[30] Foreign Application Priority Data

Aug. 1, 1997 [FR] France ................... 97 09880

[51] Int. Cl.$^6$ .............. F16F 13/00; F16F 9/00; F16F 7/00
[52] U.S. Cl. .............. 267/140.12; 267/140.13; 267/219; 267/141.5
[58] Field of Search ............. 267/140.11, 140.12, 267/140.13, 140.14, 140.15, 219, 220, 292, 293, 294, 141, 152, 153, 140.5, 140.3, 140.4, 140.2, 141.6, 141.5; 248/562, 636, 638; 180/312, 300, 902

[56] References Cited

U.S. PATENT DOCUMENTS

| | | | |
|---|---|---|---|
| 4,768,760 | 9/1988 | Le Fol | 267/140.1 |
| 5,386,976 | 2/1995 | Rudolph | 267/140.12 |
| 5,549,283 | 8/1996 | Bellamy et al. | 267/140.12 |
| 5,556,071 | 9/1996 | Bellamy et al. | 248/634 |
| 5,711,513 | 1/1998 | Bretaudeau et al. | 267/140.12 |
| 5,741,001 | 4/1998 | Bellamy et al. | 248/634 |
| 5,855,352 | 1/1999 | Bellamy et al. | 267/140.12 |

FOREIGN PATENT DOCUMENTS

| | | |
|---|---|---|
| 0 577 916 A1 | 1/1994 | European Pat. Off. . |
| 0 646 735 A1 | 4/1995 | European Pat. Off. . |
| 0 709 594 A1 | 5/1996 | European Pat. Off. . |
| 0 721 071 A1 | 7/1996 | European Pat. Off. . |
| 2 593 255 | 7/1987 | France . |
| 63172036 | 7/1988 | Japan . |
| 08135720 | 5/1996 | Japan . |

OTHER PUBLICATIONS

French Preliminary Search Report dated May 13, 1998, French Application FR 9709880.

*Primary Examiner*—Douglas C. Butler
*Attorney, Agent, or Firm*—Marshall O'Toole; Gerstein, Murray & Borun

[57] ABSTRACT

A hydraulic antivibration support comprises a strength member connected to a plate by an elastomer body whose base is pressed against the plate to define two hydraulic chambers and a narrow channel, all filled with liquid. A perforated insert embedded in the base of the elastomer body has tabs crimped over two opposite reception edges of the plate, which edges form rims projecting away from the perforated insert. Each tab has a free end folded behind the corresponding rim to anchor the tab onto the rim.

5 Claims, 2 Drawing Sheets

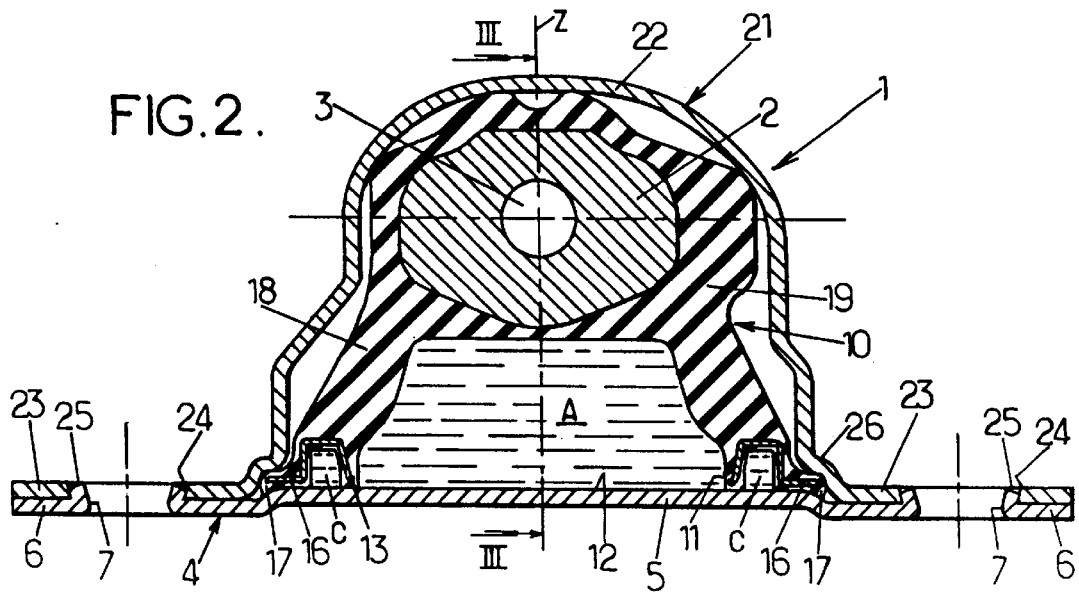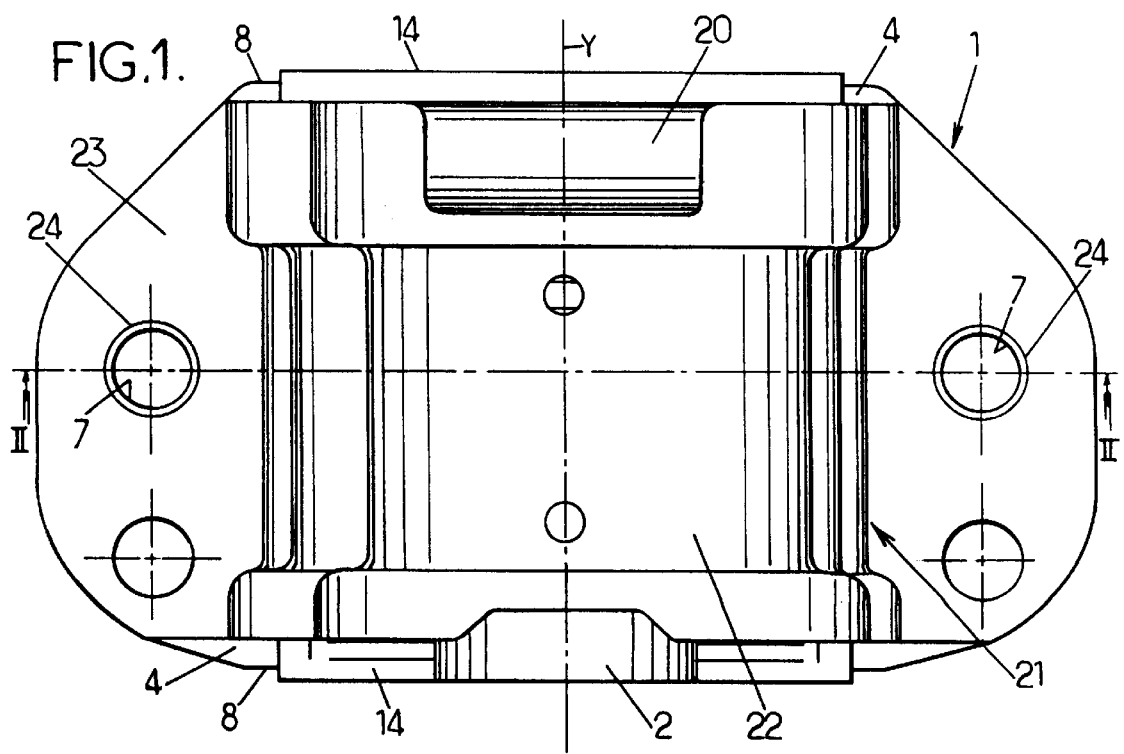

HYDRAULIC ANTIVIBRATION SUPPORT

FIELD OF THE INVENTION

The present invention relates to hydraulic antivibration supports.

More particularly, the invention relates to a hydraulic antivibration support designed to be interposed between two rigid elements to damp vibration between the two elements essentially along a first axis, the support comprising:

first and second rigid strength members suitable for securing respectively to the two rigid elements to be united, the second strength member being constituted by a plate which extends perpendicularly to the first axis and which has a "support" face facing towards the first strength member;

an elastomer body connecting the first strength member to the plate and having a base pressed in sealing contact against the support face of the plate merely by being clamped parallel to the first axis, said axial clamping being obtained by means of a rigid perforated insert which is embedded in the base of the elastomer body and which is secured to the plate by crimping tabs over reception edges, said tabs belonging to one of the perforated insert and the plate and said reception edges belonging to the other, the base of the elastomer body having, at its periphery, firstly at least two opposite "fixing" edges along which said crimping is performed, and secondly at least two free edges which interconnect the fixing edges, the perforated insert itself having free edges which are embedded in the free edges of the base of the elastomer body and which are merely pressed axially against the support face of the plate, the elastomer body also having a bell-shaped thick wall extending along the first axis flaring from a top secured to the first strength member to the base of said elastomer body, and co-operating with the support face of the plate to define at least a first hydraulic chamber filled with liquid;

a deformable second hydraulic chamber which is also filled with liquid; and a narrow channel filled with liquid and interconnecting the first and second hydraulic chambers.

BACKGROUND OF THE INVENTION

Document EP-A-0 646 735 describes an example of an hydraulic antivibration support of the above-specified type, in which the reception edges on which the tabs are crimped to assemble the support are merely plane borders extending perpendicularly to the first axis.

Experience has shown that when such antivibration supports are in use, the tabs can tend to come open under the effect of the repeated dynamic forces to which they are subjected, thus running the risk of leading to leakage from a hydraulic support.

OBJECTS AND SUMMARY OF THE INVENTION

A particular aim of the present invention is to mitigate that drawback.

To this end, according to the invention, in a hydraulic antivibration support of the kind in question the reception edges present respectively rims projecting axially away from the part carrying the corresponding tab, said rims forming respective inwardly-directed shoulders extending perpendicularly to the first axis, the tab corresponding to each of said rims having a free end which is folded behind said shoulder to anchor said tab on said rim, thereby preventing the crimped tab from opening outwards.

By means of these dispositions, the crimped tabs no longer tend to open during use of the antivibration support, thereby conserving good sealing.

In preferred embodiments of the invention, use may optionally be made of one or more of the following dispositions:

the crimped tabs belong to the perforated insert and the corresponding reception edges belong to the plate;

the base of the elastomer body has two fixing edges interconnected by two free edges;

a rigid cover covers the thick wall of the elastomer body, at least in part, so as to limit displacement of the first strength member relative to the plate, said cover being generally $\Omega$-shaped and open on a second axis perpendicular to said first axis, with two fixing flanges secured to the plate, and the first strength member is in the form of an elongate rigid member extending longitudinally along said second axis; and the elastomer body also has a freely-deformable thin wall which co-operates with the support face of the plate to define the second hydraulic chamber, the narrow channel itself being defined between the base of the elastomer body and said support face of the plate.

BRIEF DESCRIPTION OF THE DRAWINGS

Other characteristics and advantages of the invention appear from the following description of embodiments thereof given as non-limiting examples and described with reference to the accompanying drawings.

In the drawings:

FIG. 1 is a plan view of a hydraulic antivibration support constituting an embodiment of the invention;

FIG. 2 is a section view on line II—II of FIG. 1;

MORE DETAILED DESCRIPTION

In the various figures, the same references designate elements that are identical or similar.

Figure 3:
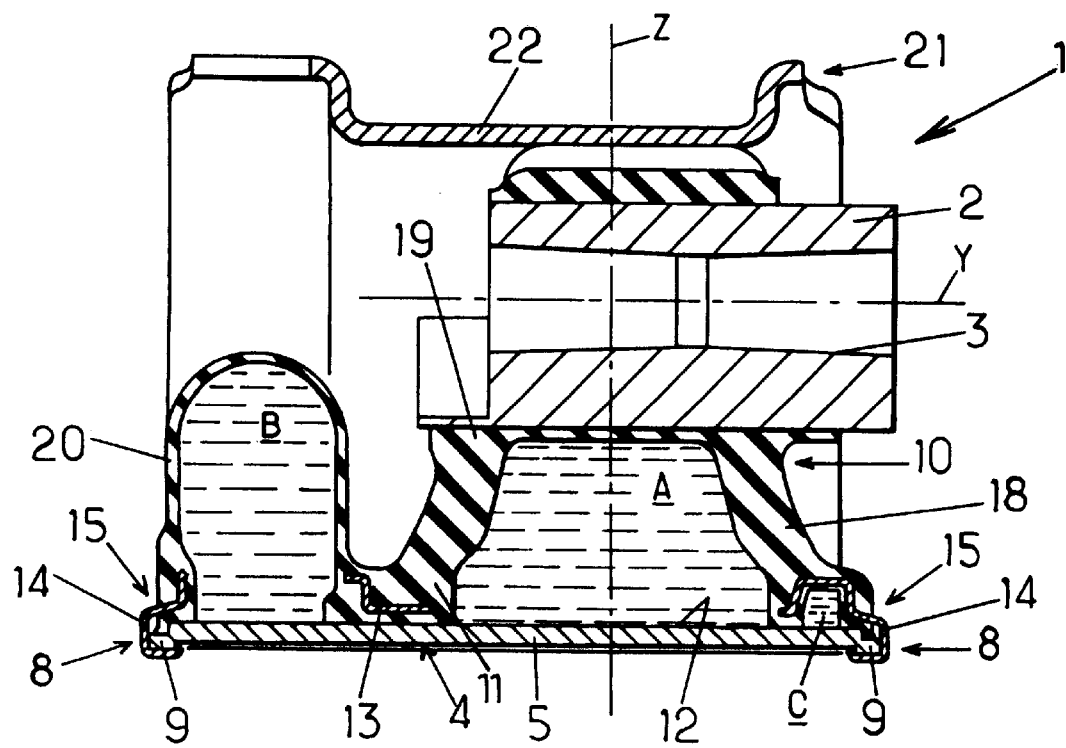
FIG. 3 is a section view on line III—III of FIG. 2.

The hydraulic antivibration support 1 shown in FIGS. 1 to 3 is designed to be interposed between two rigid elements such as the structure and the power unit of a vehicle, for the purpose of supporting the power unit and of damping and filtering vibration between those two elements, essentially along a vertical axis Z.

The antivibration support comprises firstly a first rigid strength member 2 in the form of an elongate metal member extending along an axis Y perpendicular to the axis Z and pierced by a central hole 3 enabling it to be fixed to the power unit of the vehicle, for example.

This first strength member 2 is disposed above a second rigid strength member 4 in the form of a metal plate that is substantially plane in general shape, extending perpendicularly to the axis Z, i.e. horizontally.

The plate 4 has a stamped central portion 5 that is plane in shape, and that is slightly raised relative to two fixing flanges 6 at opposite ends of said central portion.

Each of the flanges 6 is provided with at least one fixing hole 7 designed to fix the plate 4 to the structure of the vehicle.

Naturally, the plate 4 could be fixed to the power unit and the strength member 2 to the structure, in which case the strength member 2 would be situated beneath the plate 4, and the overall disposition of the antivibration support would then be upside-down relative to the disposition shown in the drawings.

In addition, the plate 4 has two lateral edges 8 each extending between the two fixing flanges 6 and forming respective rims or margins 9 that are offset downwards relative to the central portion 5.

Also, the plate 4 is connected to the strength member 2 by an elastomer body 10 which is molded as a single piece and which has a base 11 pressed in sealed manner against the support or top face 12 of the plate 4, merely by axial clamping parallel to the axis Z.

This axial clamping is obtained by crimping a perforated and stamped rigid metal insert 13 which is generally made of steel and which is embedded in the base 11 of the elastomer body.

More particularly, the perforated insert 13 has two side tabs 14 which project outwards from two opposite edges 15 of the base of the elastomer body, which extend along the length of the rims 9, and which are crimped to said rims 9.

In addition, the tabs 14 of the perforated insert 13 are connected to each other by two opposite edges 16 of said insert, which edges together with the tabs 14 form the periphery of the perforated insert, with each edge constituting a plane margin parallel to the plane of the plate 4.

These two free edges 16 are embedded in the base 11 of the elastomer body, thereby likewise forming two free edges 17 corresponding to the edges 16, said free edges 16, 17 being merely pressed axially against the top face 12 of the plate, without crimping.

The elastomer body 10 also has a bell-shaped thick wall 18 having sufficient compression strength to support the power unit. This wall 18 flares downwards from a top 19 bonded to the strength member 2 to the base 11 of the elastomer body, co-operating with the top face 12 of the plate to define a working chamber A which is filled with liquid.

In addition, the elastomer body 10 also forms a flexible membrane 20 that is likewise bell-shaped, that is freely deformable, and that co-operates with the top face 12 of the plate to define a compensation chamber B which is also filled with liquid.

The two chambers A and B are thus juxtaposed in non-concentric manner on the top face 12 of the plate, and these two chambers may, for example, be substantially in alignment on the axis Y.

Furthermore, the two chambers A and B communicate with each other via a narrow channel C which is defined between the top face 12 of the plate and a groove formed in the base 11 of the elastomer body, the shape of the groove being preferably defined by stamping the perforated insert 13.

The narrow channel C thus enables liquid to be transferred between the chambers A and B for the purpose of damping vibration between the strength member 2 and the plate 4, essentially along the axis Z.

Finally, to limit displacement of the strength member 2 relative to the plate 4, the antivibration support also includes a rigid metal cover 21 which is a section member of substantially Ω-shaped section having two open axial faces extending perpendicularly to the axis Y.

The cover 21 has a central portion 22 capable of cooperating with projections on the elastomer body by coming into abutment therewith, and it extends between two horizontal flanges 23 which rest on the fixing flanges 6 of the plate.

These flanges 23 have respective fixing holes 24 in register with the fixing holes 7 of the flanges 6 so that the plate 4 and the cover 21 can be fixed together by being screwed to the structure of the vehicle.

In addition, the flanges 23 and 6 are advantageously also fixed to each other by crimping.

By way of example, the crimping can be performed by flaring portions 25 of the plate 4 through the holes 24 in the flanges of the cover, in which case the holes are frustoconically shaped, flaring upwards.

Finally, between its central portion 22 and each of its flanges 23, the cover also has a step 26 forming a bearing zone which presses parallel to the axis Z against the free edges 16 and 17 of the perforated insert and the base of the elastomer, thereby pressing said free edges against the top face 12 of the plate.

This guarantees that the free edges 16 and 17 are clamped with a controlled amount of force against the plate 4, thereby avoiding any leakage of liquid between said plate and the base of the elastomer body via said free edges 16 and 17.

In addition, sealing of the antivibration support is also guaranteed at the edges 15 of the base of the elastomer body.

Figure 4:
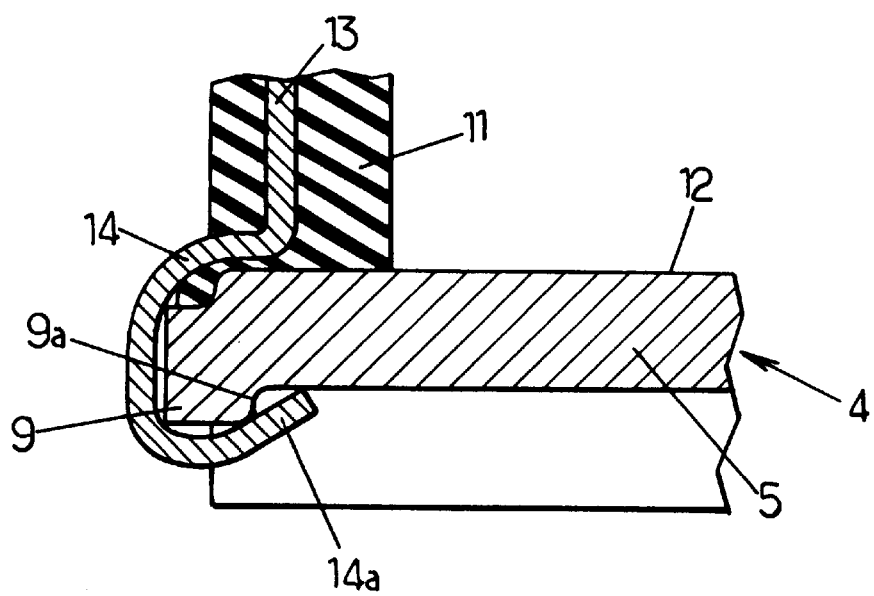
FIG. 4 is a detail view of FIG. 3.

For this purpose, as shown in FIG. 4, the free ends 14a of the crimped tabs 14 are folded behind the inside shoulders 9a formed by the rims 9, thereby anchoring said tabs to said rims in such a manner that the crimped tabs 14 cannot open outwards.

This avoids any loosening of the crimping between the perforated insert 13 and the plate 4.

We claim:

1. A hydraulic antivibration support designed to be interposed between two rigid elements to damp vibration between the two elements essentially along a first axis, the support comprising:

first and second rigid strength members suitable for securing respectively to the two rigid elements to be united, the second strength member being constituted by a plate which extends perpendicularly to the first axis and which has a support face facing towards the first strength member;

an elastomer body connecting the first strength member to the plate and having a base pressed in sealing contact against the support face of the plate merely by being clamped parallel to the first axis, said axial clamping being obtained by means of a rigid perforated insert which is embedded in the base of the elastomer body and which is secured to the plate by crimping tabs over reception edges, said tabs belonging to one of the perforated insert and the plate and said reception edges belonging to the other, the base of the elastomer body having, at its periphery, firstly at least two opposite fixing edges along which said crimping is performed, and secondly at least two free edges which interconnect the fixing edges, the perforated insert itself having free edges which are embedded in the free edges of the base of the elastomer body and which are merely pressed axially against the support face of the plate, the elastomer body also having a bell-shaped thick wall extending along the first axis flaring from a top secured to the first strength member to the base of said elastomer body, and co-operating with the support face of the plate to define at least a first hydraulic chamber filled with liquid;

a deformable second hydraulic chamber which is also filled with liquid; and a narrow channel filled with liquid and interconnecting the first and second hydraulic chambers;

wherein the reception edges present respectively rims projecting axially away from the part carrying the corresponding tab, said rims forming respective inwardly-directed shoulders extending perpendicularly to the first axis, the tab corresponding to each of said rims having a free end which is folded behind said shoulder to anchor said tab on said rim, thereby preventing the crimped tab from opening outwards.

2. A hydraulic antivibration support according to claim 1, in which the crimped tabs belong to the perforated insert and the corresponding reception edges belong to the plate.

3. A hydraulic antivibration support according to claim 1, in which the base of the elastomer body has two fixing edges interconnected by two free edges.

4. A hydraulic antivibration support according to claim 3, in which a rigid cover covers the thick wall of the elastomer body, at least in part, so as to limit displacement of the first strength member relative to the plate, said cover being generally $\Omega$-shaped and open on a second axis perpendicular to said first axis, with two fixing flanges secured to the plate, and the first strength member is in the form of an elongate rigid member extending longitudinally along said second axis.

5. A hydraulic antivibration support according to claim 1, in which the elastomer body also has a freely-deformable thin wall which co-operates with the support face of the plate to define the second hydraulic chamber, the narrow channel itself being defined between the base of the elastomer body and said support face of the plate.

* * * * *